United States Patent
Dongare et al.

(10) Patent No.: US 9,149,673 B2
(45) Date of Patent: Oct. 6, 2015

(54) REMOVAL OF ORGANIC DYES AND ORGANIC POLLUTANTS BY TITANIUM PEROXIDE GEL

(75) Inventors: Mohan Kerba Dongare, Maharashtra (IN); Shubhangi Bhalchandra Umbarkar, Maharashtra (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 323 days.

(21) Appl. No.: 13/387,842

(22) PCT Filed: Jul. 30, 2010

(86) PCT No.: PCT/IN2010/000507
§ 371 (c)(1),
(2), (4) Date: Jan. 30, 2012

(87) PCT Pub. No.: WO2011/013146
PCT Pub. Date: Feb. 3, 2011

(65) Prior Publication Data
US 2012/0125844 A1    May 24, 2012

(30) Foreign Application Priority Data
Jul. 31, 2009   (IN) ............................ 1577/DEL/2009

(51) Int. Cl.
| | | |
|---|---|---|
| B01D 15/38 | (2006.01) | |
| A62D 3/38 | (2007.01) | |
| A62D 3/11 | (2007.01) | |
| A62D 3/176 | (2007.01) | |
| G01N 30/02 | (2006.01) | |
| A62D 101/20 | (2007.01) | |

(52) U.S. Cl.
CPC *A62D 3/11* (2013.01); *A62D 3/176* (2013.01); *A62D 3/38* (2013.01); *B01D 15/3861* (2013.01); *B01D 15/3871* (2013.01); *A62D 2101/20* (2013.01); *Y02W 10/37* (2015.05)

(58) Field of Classification Search
None
See application file for complete search history.

(56) References Cited

U.S. PATENT DOCUMENTS 5,275,741 A *  1/1994  Miano et al. ............. 210/748.14
7,931,812 B2 * 4/2011  Tian ........................ 210/748.01

OTHER PUBLICATIONS

Sonawane et al. Sol-Gel synthesis of Au/TiO2 thin films for photocatalytic degradation of phenol in sunlight. Journal of Molecular Catalysis A: Chemical 243 (2006) 68-76.*
Sonawane et al. Preparation of titanium(IV) oxide thin film photocatalyst by sol-gel dip coating. Materials Chemistry and Physics 77 (2002) 744-750.*
"Gel." The Hutchinson unabridged encyclopedia with atlas and weather guide. Abington: Helicon, 2013. Credo Reference. Web. Mar. 12, 2014.*
Stoessel, Francis (2008). Thermal Safety of Chemical Processes—Risk Assessment and Process Design. John Wiley & Sons. Online version available at: http://app.knovel.com/hotlink/toc/id:kpTSCPRAP3/thermal-safety-chemical.*
Jones, Craig W. (1999). Applications of Hydrogen Peroxide and Derivatives. Royal Society of Chemistry. Online version available at: http://app.knovel.com/hotlink/toc/id:kpAHPD0001/applications-hydrogen.*
Subramanian et al. Catalysis with TiO2/Gold Nanocomposites. Effect of Metal Particle Size on the Fermi Level Equilbration. Dec. 4, 2003. JACS.*
Yao et al. Decolorization of Methylene Blue with TiO2 Sol via UV Irradiation Photocatalytic Degradation. Hindawi Publishing Corporation. Jun. 2010.*
Nelson et al. Control of Surface and zeta Potentials on Nanoporous TiO2 Films by Potential Determining and Specifically Adsorbed Ions. Apr. 2000. Langmuir 2000, 16, 6094-6101.*
Kamat. Improving the Photoelectrochemical Performance of Nanostructure TiO2 Films by Adsorption of Gold Nanoparticles. Mar. 2000. J. Phys. Chem. B 2000,104, 10851-10857.*
Han et al. Tailored TiO2 photocatalysts for the degradation of organic dyes in wastewater treatment: A review. Mar. 2009. Applied Catalysis A: General 359 (2009) 25-40.*
Mohamed. Removal of Organic Compounds from Water by Adsorption and Photocatalytic Oxidation. May 2011.*

* cited by examiner

*Primary Examiner* — Katherine Zalasky
*Assistant Examiner* — Kara Graber
(74) *Attorney, Agent, or Firm* — Abelman, Frayne & Schwab

(57) ABSTRACT

The one step process of removal of chromophore/dye/organic pollutant from a solution comprising a polymer free titanium oxide gel i.e. high zeta potential is disclosed. The concentration of the chromophores is removed up to 95-100%.

8 Claims, No Drawings

REMOVAL OF ORGANIC DYES AND ORGANIC POLLUTANTS BY TITANIUM PEROXIDE GEL

This application claims priority to and the benefit of International PCT Application Serial No. PCT/IN2010/000507, filed Jul. 30, 2010, and also claims priority to Indian Patent Application No. 1577/DEL/2009, filed Jul. 31, 2009, both applications are incorporated by reference herein in their entirety.

FIELD OF INVENTION

The present invention relates to process for the removal of organic dye and organic pollutants from a solution using titanium peroxide gel. The present invention also relates to a process for the regeneration of titanium peroxide gel which can be reused for the removal process.

BACKGROUND AND PRIOR ART

The textile and dye industries are considered to be two of the most polluting industries. While the concentration of colored components or colour contributing components in the effluent may be very small and may not be always toxic, they are a cause for substantial public apprehension due to the intense and unacceptable-colour of the effluents. Physical, chemical, biological and physico-chemical methods have been tried to treat these chromophores with various advantages and disadvantages. The approach seems to now have changed from their treatment to their removal. The factors to be considered with regard to removal by physical, chemical, biological and physico-chemical methods include cost, effectiveness, colour, need for large areas of space, ease of use, generation of concentrated sludge, large quantity of dissolved solids posing problems for its recycle or its safe disposal in the environment amongst others.

Research on novel photocatalysts using semiconductor materials (e.g., titanium dioxide) has been consistently conducted for scientific and commercial purposes. Particularly, titanium dioxide photocatalysts have been used as a means to remove pollutants causing serious environmental problems.

An article titled "Sol-gel synthesis of Au/TiO2 thin films for photo catalytic degradation of phenol in sunlight";—in Journal of Molecular Catalysis A: Chemical 243 (2006) 68-76; by R. S. Sonawana, M. K. Dongare discloses preparation of AuATiO$_2$ thin films used in photocatalytic decomposition of organic matter and capable of being reused repeatedly.

Photocatalytic degradation of various types of dyes such as Alizarin S, Crocein Orange G, Methyl Red, Congo Red, Methylene Blue and other organic pollutants in water by UV-irradiated titania is disclosed in an article titled "Photocatalytic degradation of various types of dyes in water by UV-irradiated titania" by Hinda Lachheb, Eric Puzenat, Ammar Houas in Applied Catalysis B: Environmental Volume 39, Issue 1, 8 Nov. 2002, Pages 75-90.

An article titled "Tailored titanium dioxide photocatalysts for the degradation of organic dyes in wastewater treatment: A review by Fang Han, Venkata Subba et al in applied Catalysis A: General Volume 359, Issues 1-2, 15 May 2009, Pages 25-40; discloses photocatalytic decomposition of organic pollutants and organic dyes from industrial waste water effluents involving TiO$_2$ or modified TiO$_2$.

An article titled "Preparation of titanium(IV) oxide thin film photo catalyst by sol-gel dip coating" in Materials Chemistry and Physics 77 (2002) 744-750 by R. S. Sonawane, S. G. Hegde, M. K. Dongare discloses TiO$_2$ films which were used for photo catalytic decomposition of salicylic acid and methylene blue.

An article in International Journal of Photoenergy Volume 2009, Article ID 962783, 8 pages doi: 10.1155/2009/962783 titled "Nanosized TiO$_2$ photocatalyst powder via sol-gel method: effect of hydrolysis degree on powder properties" by Nor Hafizah and Iis Sopyan discloses synthesis of nanosized TiO$_2$ powder via sol-gel method using titanium tetraisopropoxide (TPT) as the precursor in methanol for degradation of phenol and other organic pollutants.

An article titled "Photocatalytic degradation of an azo dye in a tubular continuous-flow photoreactor with immobilized TiO$_2$ on glass plates" by Behnajady M. A. et al in Chemical engineering journal. ISSN 1385-8947, 2007, vol. 127, no1-3, pp. 167-176 discloses the photocatalytic degradation of C.I. Acid Red 27 (AR27), an anionic monoazo dye of acid class in aqueous solutions in a tubular continuous-flow photoreactor with immobilized TiO$_2$ on glass plates. It was observed that the removal efficiency increases as the light intensity increases but it decreases when the flow rate is increased. The final outlet stream of the photoreactor showed complete mineralization of the dye.

A disadvantage associated with the use of titanium dioxide as a photocatalyst is that light of short wavelengths in the ultraviolet (UV) region is required. Also, TiO$_2$ absorbs only 3-5% energy of the solar spectrum. For these reasons, there is a continuing need to modify pure titanium dioxide to develop photocatalytic materials capable of possessing photocatalytic activity even under visible light.

Further, molecular modification achieved in the prior art processes are complex and depend on the monomer concentration, bimolecular condensation rate and functionality that depends on the hydrolysis rate. Moreover, TiO$_2$ is used as thin films or in polymer gel powder. The photocatalytic activity is observed to be low due to low porosity and low surface area.

Also, TiO$_2$ films for photocatalytic decomposition of organic matter suffer from drawbacks of efficiency and versatility. The thin film comprises 100% TiO$_2$, where the gel of the invention has been prepared with extremely low concentrations of Ti salts. Further, the Ti film is limited in its ability to treat a variety of dyes as compared to the gels of the invention exemplified herein.

Therefore there still remains a need in the art to provide a simple process for the removal of chromophores. Also, the process should be such that the treated effluent appears colorless after removal of the chromophores. Preferably, the sludge generated from the process should be easily degradable without further elaborate processes requiring time and energy resources. Further, it would definitely be advantageous if the process of the invention removes chromophores and simultaneously removes other pollutants such as phenol, methanol, formalin, hexamine and such like from the effluents, since their removal is also a challenging task to meet the environmental regulations.

OBJECTIVES OF THE INVENTION

The main object of the invention is to develop a process for the removal of organic dye and organic pollutants from solution using titanium peroxide gel.

Another object of the invention is to develop an efficient, economical process for the separation of organic dyes and organic pollutants using polymer free modified titanium peroxide gel.

Another object of the present invention is to provide a process whereby titanium peroxide gel used for the separation of environmental pollutants can be regenerated and reused.

SUMMARY OF THE INVENTION

Accordingly, the present invention provides a process for the removal of organic dye and organic pollutants from solution using titanium peroxide gel, wherein, a solution of chromophores, dyes or organic pollutants is mixed with titanium peroxide gel at room temperature and allowed to stand for a period of 5 to 25 minutes to obtain a clear, almost colorless solution.

In one aspect of the invention, Titanium peroxide gel having high viscosity and high zeta potential is optionally doped with metals or metal oxides. The titanium peroxide gel of the present invention is polymer free. The titanium salt in the gel is in the range of 0.001-0.005 wt %. The metals are doped in the range of 0.1-4 wt % and the particle size of the doped metals is less than 10 nm.

In another aspect, titanium peroxide gel can be recovered by degradation of chromophore/dye/organic pollutants by processes selected from, but not limited to exposing to light either from natural or artificial source, physical processing, chemical processing, treating with oxidizing agents like hypochlorites or commercial whiteners and the like.

In another aspect of the process of the present invention, the gel is put in a column and the dye solution is passed through it to collect a clear solution downstream.

In a further embodiment of present invention, a process for the removal of organic dye and/or organic pollutants from solution using titanium peroxide gel is provided, said process comprising:
a) adding titanium peroxide gel into the solution in a ratio ranging between 1:5 to 1:20 volume/volume of gel/dye solution;
b) shaking the mixture as obtained in step (a) vigorously at temperature ranging between 25-35° C.;
c) allowing the mixture as obtained in step (b) to stand for 5 to 25 minutes to obtain dye or organic pollutant adsorbed titanium peroxide gel and clear, colorless supernatant followed by filtering the mixture to obtain dye or organic pollutant adsorbed titanium peroxide gel;
d) transferring dye or organic pollutant adsorbed titanium peroxide gel as obtained in step (c) in a water containing beaker;
e) degrading adsorbed dye or organic pollutant from the dye or organic pollutant adsorbed titanium peroxide gel to recover the titanium peroxide gel which can be recycled and reused.

In another embodiment of the present invention, wherein the solution comprises organic dye and/or organic pollutants and a solvent selected from the group consisting of water, acetone, chlorinated solvents and alcohols.

In another embodiment of the present invention, wherein titanium peroxide gel used in step (a) has a zeta potential in the range of −54 to −25 mV and viscosity in the range of 12000-15000 cPs.

In another embodiment of the present invention, wherein titanium peroxide gel is used in step (a) it is optionally doped with noble and transition metals selected from the group consisting of Au, Ag, nickel, copper, iron, molybdenum, vanadium, tungsten and platinum in the range of 0.1-4 wt %.

In another embodiment of the present invention, wherein an organic dye or an organic pollutant selected from the group of methylene blue, methyl orange, methyl violet, malachite green, Rhodamine B, bromophenol blue, parabase solution, magenta solution, ink, formaldehyde solution, synthetic hexamine waste water, and phenol is removed.

In another embodiment of the present invention, the titanium peroxide gel used in step (a) is put in a column and the dye solution is allowed to pass through it to obtain clear, colorless supernatant.

In another embodiment of the present invention, the concentration of the organic dye and organic pollutants is removed up to 95-100%.

In another embodiment of the present invention, degradation of organic dye and organic pollutant from dye or organic pollutant adsorbed titanium peroxide gel in step (f) is done by exposing it under sunlight with or without an oxidant.

In another embodiment of the present invention, an oxidant is used and is selected from the group consisting of hydrogen peroxide and sodium hypochlorite.

DETAILED DESCRIPTION OF THE INVENTION

"Titanium peroxide gel" of the invention is defined for the purpose of this document as "The solution of titanium salts which after condensation/polymerization forms a viscous jelly like structure with higher zeta potential."

"Organic dye" of the invention includes the component that contributes to its color, the chromophores.

The present invention relates to a process wherein optionally modified/doped titanium peroxide gels with high viscosity and high zeta potential are used for the removal of chromophore/dye/organic pollutants from the industrial aqueous effluents by adsorption on these gels. The gel is non soluble in aqueous solution and can be recovered and can be reused several times.

The present invention relates to a one pot process for removal of chromophore/dye/organic pollutant by steps comprising of;
a) mixing, optionally doped, polymer free titanium peroxide gel with the solution of chromophore/dye/organic pollutant and allowing the mixture to stand for 5 to 25 minutes whereby the chromophore/dye/organic pollutant gets adsorbed on the gel;
b) separating the adsorbed gel-chromophore, gel-dye or gel-pollutant to obtain clear, colorless supernatant; and
c) degrading the separated gel-chromophore, gel-dye or gel-pollutant to recover the gel which can be recycled and reused.

Alternately, the process for the separation of organic dye or the pollutant comprises eluting the solution of chromophore/dye/organic pollutant through a glass column consisting of optionally doped polymer free titanium peroxide gel at a rate of 5 ml/min to obtain a clear colorless solution. The titanium peroxide gel used in the process can be recovered by degrading the chromophore/dye/organic pollutant.

The process step (a) and step (b) of the present invention comprises of mixing a solution of chromophore/dye/organic pollutant and optionally doped titanium peroxide gel with vigorous stirring and allowing standing for 5 to 25 minutes; whereby the chromophore/dye/organic pollutant gets adsorbed on the gel. On settling down, the adsorbed gel-chromophore/dye/organic pollutant is separated to obtain clear, colorless supernatant. The content of the pollutants in the supernatant is measured by measuring its optical absorption at 665, 612, 290, and 245 nm wavelengths using UV-VIS spectrophotometer.

The gel-chromophore/dye/organic pollutant is separated from the treated solution by processes selected from, e.g., filtration, decantation and others.

The concentration of the chromophore in the solution is of $10^{-3}$ to $10^{-6}$ molar concentration, which becomes almost zero after treatment with the titanium peroxide gel of the present invention.

In the process of the present invention, step (c) comprises regeneration of the gel for recycling and reuse. Accordingly, titanium peroxide gel which contains adsorbed pollutants obtained after filtration is washed with water followed by degradation of the pollutants. Degradation can be achieved by processes selected from, but not limited to exposing to light from natural or artificial source, physical processing, chemical processing, treating with oxidizing agents such as hypochlorite- or commercial whiteners and such like.

The regenerated gel can then be recycled and reused without much change in its efficiency for the removal of the chromophore/dye/organic pollutant as discussed in step (a).

Titanium peroxide gel used in the process of the present invention can be synthesized from titanium alkoxide and hydrogen peroxide as precursors. Accordingly, titanium butoxide is hydrolyzed using DI water to form titanium hydroxide precipitate followed by adding hydrogen peroxide to yield yellow colored titanium peroxide sol which on further dilution yields titanium peroxide of very low viscosity of 4-5 cPs. On standing for about 48 hours. polymer free peroxide gel is obtained having high viscosity in the range of 12000-16000 cPs and high zeta potential in the range of −54 to −25 mV. The concentration of titanium salt in the gel is in the range of 0.001-0.005 wt %.

The chromophores of the present invention are selected from, but not limited to industrial effluents, organic chromophores, colored compounds, dyes, azo dyes and such like. The dyes are selected from the group of methylene blue, methyl orange, basic violet, parabase, bromophenol blue and natural ink. The organic pollutants are selected from, but not limited to hexamine, waste water, methanol and phenol.

The solvents used to form a dye solution is selected from, but not limited to water, acetone, chlorinated solvents, alcohols and such like.

Titanium (IV) radical complexes have strong absorption bands in the region of 300-500 nm and hence induces photocatalytic processes which accelerate the degradation of the chromophores and the organic pollutants adsorbed on the gel.

In the present invention, the photocatalytic activity of the peroxide can further be enhanced by doping metals or metal oxides into the gel. The metals are selected from noble metals such as Au, Ag, Ni, Cu, Pt etc. Metals such as iron, molybdenum, vanadium, and tungsten either as such or in salt form are also used as doping agents. The particle size of the doped metals is less than 10 nm. The metals are doped in the range of 0.1-4 wt %.

In the present invention, doping with metals or metal oxides as described above reduces the band gap energy to allow the photocatalyst to exhibit photocatalytic activity even in the visible region.

The doped titanium peroxide gel is prepared by dissolving the aqueous solution of the precursors of the metals in the form of its salt or oxide into the titanium peroxide solution of low viscosity (4-5 cPs) and maintaining it for about 48 hours, to obtain a polymer free gel with high viscosity in the range of 12000-15000 cPs and high zeta potential in the range of −52 to −25 mV. The viscosity of the gel was measured using a Brookfield viscometer having the RV type of spindles. The zeta potential of the gels was measured using "90 Plus Particle size analyzer" by Brookhaven Instrument Corporation USA.

The processes of the present invention are found to be advantageous for complete removal of chromophores/dyes along with organic pollutants, using the said titanium peroxide gel optionally doped with metals or metal oxides as can be seen from zero absorbance in the visible range.

The present invention is described in further detail with reference to the examples, which are given by way of illustration only and therefore should not be construed to restrict the scope of the invention.

Example 1

The titanium peroxide gel used in the present invention was prepared using titanium butoxide (AR grade Aldrich make) as titanium source. 4.6 g titanium butoxide was hydrolyzed using 25 ml of distilled water resulting in formation of titanium hydroxide precipitate. The supernatant liquid from the titanium hydroxide was decanted and 25 ml hydrogen peroxide (50% Asian Peroxide make) was added slowly to the titanium hydroxide. The highly vigorous and exothermic reaction between hydrogen peroxide with freshly prepared titanium hydroxide resulted in yellow colored titanium peroxide sol which was further diluted to 450 ml with distilled water to obtain titanium peroxide of very low viscosity of 5 cPs. The titanium peroxide solution thus obtained was kept for about 48 hours and the viscosity of the gel increased to 12000 cPs. The zeta potential of the gel thus obtained was measured and found to increase gradually to-54 milivolt indicating the stability of the gel. The gel with 12000 cps viscosity and zeta potential of −54 milivolt was used in the present invention.

Example 2

The titanium peroxide solution of low viscosity (5 cPs) was prepared as per the procedure given in example 1. An Au nano particle solution was prepared by dissolving 0.021 g chloroauric acid in 200 ml distilled water and was further reduced using sodium borohydride solution (0.0045 g in 25 ml water) to obtain a pink colored solution. This pink solution of gold nanoparticles was added to the above mentioned titanium peroxide solution to obtain a homogeneous violet colored transparent solution. The gold containing titanium peroxide solution thus obtained was kept for about 48 hours and the viscosity of the gel increased to 12000-15000 cPs. The zeta potential of the gel thus obtained increased gradually to −31 milivolt indicating increased stability of the gel with time. The gel with 15000 cps viscosity and zeta potential of −31 milivolt was used in the present invention.

Example 3

The titanium peroxide solution of low viscosity (5 cPs) was prepared as per the procedure given in example-1. An aqueous solution of iron nitrate (0.055 g in 25 ml water) was added to the abovementioned titanium peroxide solution. The iron containing titanium peroxide solution thus obtained was kept for about 48 hours and the viscosity of the gel increased to 12000-15000 cPs. The zeta potential of the gel thus obtained was measured and found to increase gradually to −25 milivolt indicating the stability of the gel. The gel with 15000 cPs viscosity and zeta potential of −25 milivolt was used in the present invention.

Example 4

The titanium peroxide solution of low viscosity (5 cPs) was prepared as per the procedure given in example 1. Vanadium pentoxide (0.05 g) was suspended in 25 ml water. To this suspension 5 ml hydrogen peroxide (50% Asian Peroxide make) was added slowly to get a clear red colored peroxovanadic acid solution. This peroxovanadic acid solution was added to the abovementioned titanium peroxide solution. The vanadium containing titanium peroxide solution thus obtained was kept for about 48 hours and the viscosity of the gel increases to 12000-15000 cPs. The zeta potential of the gel thus obtained was measured and found to increase gradually to −27 milivolt indicating the stability of the gel. The gel with 15000 cPs viscosity and zeta potential of −27 nvltvolt was used in the present invention.

Example 5

The titanium peroxide solution of low viscosity (5 cPs) was prepared as per the procedure given in example 1. Ammonium heptamolybdate (0.023 g) was suspended in 10 ml water. To this suspension 5 nil hydrogen peroxide (50% Asian Peroxide make) was added slowly to get a clear yellow colored solution. This yellow solution was added to the abovementioned titanium peroxide solution. The molybdenum containing titanium peroxide solution thus obtained was kept for about 48 hours and the viscosity of the gel increases to 12000-15000 cPs. The zeta potential of the gel thus obtained was measured and found to increase gradually to −57 milivolt indicating the stability of the gel. The gel with 15000 cPs viscosity and zeta potential of −57 milivolt was used in the present invention.

Example 6

The titanium peroxide solution of low viscosity (5 cPs) was prepared as per the procedure given in example-1. A Pt nano particle solution was prepared by dissolving 0.027 g chloroplatinic acid in 200 ml distilled water and was further reduced using sodium borohydride solution (0.0045 g in 25 ml water) to obtain a pink colored solution. The black solution of platinum nanoparticles was added to the abovementioned titanium peroxide solution to obtain homogeneous dark colored transparent solution. The platinum containing titanium peroxide solution thus obtained was kept for about 48 hours and the viscosity of the gel increased to 12000-15000 cPs. The gel with 15000 cPs viscosity was used in the present invention.

The titanium peroxide gel prepared as per example 1 is used in examples 7-8

Example 7

10 g titanium peroxide gel was added to 250 ml beaker containing 100 ml $10^{-4}$ molar methylene blue-solution. The solution was shaken vigorously and allowed to stand for five minutes. The methylene blue dye was adsorbed on the titanium peroxide gel and settled down at the bottom of the beaker with the supernatant solution becoming colorless. The solution containing titanium peroxide gel with adsorbed methylene blue dye was filtered using GI Whatman filter paper to obtain colorless solution. The methylene blue content in the solution before and after the treatment was monitored by UV-VIS spectrophotometer (Shimadzu 2010) by measuring its absorption at 665, 612, 290 and 245 nm wavelengths. The optical absorption of the initial and final solution was as follows:

| Wavelength | optical absorption (Initial) | Optical Absorption (Final) |
|---|---|---|
| 665 nm | 6.0 | 0 |
| 612 mm | 5.0 | 0 |
| 290 nm | 3.34 | 0 |
| 245 nm | 1.70 | 0 |

The zero absorbance after treatment with titanium peroxide gel indicates the complete removal of methylene blue from the aqueous solution.

Example 8

The titanium peroxide gel filtered using GI Whatman filter paper which contains adsorbed methylene blue in above example 7 was transferred to 250 ml beaker containing 10 ml water. This beaker was kept in the sunlight for 4 hours until the blue color of the gel disappeared and again regained its original yellow color. Again 100 ml $10^{-4}$ molar methylene blue solution was added to this regenerated gel, shaken vigorously and allowed to stand for five minutes. The methylene blue dye was adsorbed on the regenerated titanium peroxide gel and settled down at the bottom of the beaker with the supernatant solution becoming colorless. The solution containing regenerated titanium peroxide gel with adsorbed methylene blue dye was filtered using GI Whatman filter paper to obtain colorless solution. The methylene blue content in the solution before and after the treatment was monitored by UV-VIS spectrophotometer (Shimadzu 2010) by measuring its absorption at 665, 612, 290 and 245 nm wavelengths. The optical absorption of the initial and final solution was as follows:

| Wavelength | optical absorption (Initial) | Optical Absorption (Final) |
|---|---|---|
| 665 nm | 6.0 | 0 |
| 612 mm | 5.0 | 0 |
| 290 nm | 3.34 | 0 |
| 245 nm | 1.70 | 0 |

The zero absorbance after treatment with titanium peroxide gel indicates the complete removal of methylene blue from the aqueous solution.

Example 9

The titanium peroxide gel filtered using GI Whatman filter paper which contains adsorbed methylene blue in above example 7 was transferred to a 250 ml beaker containing 10 ml water. To this gel 0.5 ml 30% hydrogen peroxide was added. This beaker was kept in the sunlight for 1.5 hours until the blue color of the gel disappeared and again regained its original yellow color. Again 100 ml $10^{-4}$ molar methylene blue solution was added to this regenerated gel, shaken vigorously and allowed to stand for five minutes. The methylene blue dye was adsorbed on the regenerated titanium peroxide gel and settled down at the bottom of the beaker with the supernatant solution becoming colorless. The solution containing regenerated titanium peroxide gel with adsorbed methylene blue dye was filtered using G1 Whatman filter paper to obtain colorless solution. The methylene blue content in the solution before and after the treatment was monitored by UV-VIS spectrophotometer (Shimadzu 2010) by measuring its absorption at 665, 612, 290 and 245 nm wavelengths. The optical absorption of the initial and final solution was as follows:

| Wavelength | optical absorption (Initial) | Optical Absorption (Final) |
|---|---|---|
| 665 nm | 6.0 | 0 |
| 612 mm | 5.0 | 0 |
| 290 nm | 3.34 | 0 |
| 245 nm | 1.70 | 0 |

The zero absorbance after treatment with titanium peroxide gel indicates the complete removal of methylene blue from the aqueous solution.

Example 10

10 g titanium peroxide gel was taken in glass column of 15 mm i. d. and 25 cm length fitted with a sintered disc (G0) and a stopcock to control the flow of the solution. 250 ml $10^{-4}$ molar methylene blue solution was passed over this gel at a rate of 5 ml/min. The colored organic dye molecules are filtered by the gel and a clear colorless solution was obtained as filtrate. The methylene blue content in the solution before and after the treatment solution was monitored by UV-VIS spectrophotometer (Shimadzu 2010) by measuring its absorption at 665, 612, 290 and 245 nm wavelengths. The optical absorption of the initial and final solution was as follows:

| Wavelength | optical absorption (Initial) | Optical Absorption (Final) |
|---|---|---|
| 665 nm | 6.0 | 0 |
| 612 mm | 5.0 | 0 |
| 290 nm | 3.34 | 0 |
| 245 nm | 1.70 | 0 |

The zero absorbance after treatment with titanium peroxide gel indicates the complete* removal of methylene blue from the aqueous solution.

Example 11

10 g titanium peroxide gel was taken in glass column of 15 mm i. d. and 25 cm length fitted with a sintered disc (G0) and a stopcock to control the flow of the solution. 250 ml $10^{-4}$ molar methyl orange solution was passed over this gel at a rate of 5 ml/min. The colored organic dye molecules are filtered by the gel and a clear colorless solution was obtained as filtrate. The methyl orange content in the initial and final treated solution was monitored by using UV-VIS spectrophotometer (Shimadzu 2010) by measuring its absorption at 464 and 270 nm wavelength.

The optical absorption of the initial and final solution was as follows.

| Wavelength | optical absorption (Initial) | Optical Absorption (Final) |
|---|---|---|
| 464 nm | 2.5 | 0 |
| 270 nm | 0.98 | 0 |

The zero absorbance after treatment with titanium peroxide gel indicates the complete removal of methyl orange from the aqueous solution.

Example 12

10 g titanium peroxide gel was placed in a glass column of 15 mm i.d. and 25 cm length fitted with a sintered disc (G0) and a stopcock to control the flow of the solution. 250 ml $10^{-4}$ molar methyl violet solution was passed over this gel at a rate of 5 ml/min. The colored organic dye molecules were filtered by the gel and a clear colorless solution was obtained as filtrate. The methyl violet content in the initial and final treated solution was monitored by using UV-VIS spectrophotometer (Shimadzu 2010) by measuring its absorption at 581, 299, 246 and 205 nm wavelengths.

The optical absorption of the initial and final solution was as follows.

| Wavelength | optical absorption (Initial) | Optical Absorption (Final) |
|---|---|---|
| 581 nm | 2.5 | 0 |
| 299 mm | 0.7 | 0 |
| 246 nm | 0.6 | 0 |
| 205 nm | 1.5 | 0 |

The zero absorbance after treatment with titanium peroxide gel indicates the complete removal of methyl violet from the aqueous solution.

Example 13

10 g titanium peroxide gel was placed in a glass column of 15 mm i.d. and 25 cm length fitted with a sintered disc (G0) and a stopcock to control the flow of the solution. 250 ml $10^{-4}$ molar malachite green solution was passed over this gel at a rate of 5 ml/min. The colored organic dye molecules are filtered by the gel and a clear colorless solution was obtained as filtrate. The malachite green content in the initial and final treated solution was monitored by using UV-VIS spectrophotometer (Shimadzu 2010) by measuring its absorption at 618, 423, 315 and 254.8 nm wavelengths.

The optical absorption of the initial and final solution was as follows.

| Wavelength | optical absorption (Initial) | Optical Absorption (Final) |
|---|---|---|
| 618 nm | 1.1 | 0 |
| 423 mm | 0.2 | 0 |
| 315 nm | 0.3 | 0 |
| 254.8 nm | 0.6 | 0 |

The zero absorbance after treatment with titanium peroxide gel indicates the complete removal of malachite green from the aqueous solution.

Example 14

10 g titanium peroxide gel was placed in a glass column of 15 mm i. d. and 25 cm length fitted with a sintered disc (G0) and a stopcock to control the flow of the solution. 250 ml $10^{-4}$ molar Rhodamine B solution was passed over this gel at a rate of 5 ml/min. The colored organic dye molecules are filtered by the gel and a clear colorless solution was obtained as filtrate. The rhodamine B content in the initial and final treated solution was monitored by using UV-VIS spectrophotometer (Shimadzu 2010) by measuring its absorption at 551, 354 and 258 nm wavelength.

The optical absorption of the initial and final solution was as follows.

| Wavelength | optical absorption (Initial) | Optical Absorption (Final) |
|---|---|---|
| 551 nm | 3.4 | 0 |
| 354 mm | 0.3 | 0 |
| 258 nm | 1.1 | 0 |

The zero absorbance after treatment with titanium peroxide gel indicates the complete removal of Rhodamine B from the aqueous solution.

Example 15

The gel used in example 11 above was regenerated using sodium hypochlorite as oxidant. 1 nil commercially available 4% NaOCl solution was diluted to 100 ml. This diluted solution was passed through the used gel in the column. The dye adsorbed in the gel was totally degraded leaving the original yellow colour of the gel. This gel was washed with further 200 ml water to remove excess oxidant in the gel before it was reused. 250 ml $10^{-4}$ molar Rhodamine B solution was passed over this regenerated gel at a rate of 5 ml/min. The colored organic dye molecules are filtered by the regenerated gel and a clear colorless solution was obtained as filtrate. The rhodamine B content in the initial and final treated solution was monitored by using UV-VIS spectrophotometer (Shimadzu 2010) by measuring its absorption at 551, 354 and 258 nm wavelength.

The optical absorption of the initial and final solution was as follows.

| Wavelength | optical absorption (Initial) | Optical Absorption (Final) |
|---|---|---|
| 551 nm | 3.4 | 0 |
| 354 mm | 0.3 | 0 |
| 258 nm | 1.1 | 0 |

The zero absorbance after treatment with titanium peroxide gel indicates the complete removal of Rhodamine B from the aqueous solution.

Example 16

10 g titanium peroxide gel was placed in a glass column of 15 mm i. d. and 25 cm length fitted with a sintered disc (G0) and a stopcock to control the flow of the solution. 250 ml $10^{-4}$ molar bromophenol blue solution was passed over this gel at a rate of 5 ml/min. The colored organic dye molecules are filtered by the gel and a clear colorless solution was obtained as filtrate. The bromophenol blue content in the initial and final treated solution was monitored by using UV-VIS spectrophotmeter (Shimadzu 2010) by measuring its absorption at 590, 434, 311, 261 and 214 nm wavelength.

The optical absorption of the initial and final solution was as follows.

| Wavelength | optical absorption (Initial) | Optical Absorption (Final) |
|---|---|---|
| 590 nm | 3.3 | 0 |
| 434 mm | 2.7 | 0 |
| 311 nm | 1.2 | 0 |
| 261 nm | 1.5 | 0 |
| 214 nm | 4.0 | 0 |

The zero absorbance after treatment with titanium peroxide gel indicates the complete removal of bromophenol blue from the aqueous solution.

Example 17

10 g titanium peroxide gel was placed in a glass column of 15 mm i. d. and 25 cm length fitted with a sintered disc (G0) and a stopcock to control the flow of the solution. 250 ml $10^{-4}$ molar parabase solution in ethanol water mixture (5 ml ethanol+245 ml water) at neutral pH (7) was passed over this gel at a rate of 5 ml/min. The colored organic dye molecules are filtered by the gel and a clear colorless solution was obtained as filtrate. The parabase content in the initial and final treated solution was monitored by using UV-VIS spectrophotometer (Shimadzu 2010) by measuring its absorption at 540, 284 and 242 nm wavelength. The change in the optical absorption was as follows:

| Wavelength | optical absorption (Initial) | Optical Absorption (Final) |
|---|---|---|
| 540 nm | 0.5 | 0 |
| 284 mm | 0.3 | 0 |
| 242 nm | 0.65 | 0 |

The zero absorbance after treatment with titanium peroxide gel indicates the complete removal of parabase from the aqueous solution.

Example 18

10 g titanium peroxide gel was placed in a glass column of 15 mm i. d. and 25 cm length fitted with a sintered disc (G0) and a stopcock to control the flow of the solution. 250 ml $10^{-4}$ molar basic magenta solution was passed over this gel at a rate of 5 ml/min. The colored organic dye molecules are filtered by the gel and a clear colorless solution was obtained as filtrate. The basic magenta content in the initial and final treated solution was monitored by using UV-VIS spectrophotometer (Shimadzu 2010) by measuring its absorption at 542, 287 and 207 nm wavelength. The change in the optical absorption was as follows:

| Wavelength | optical absorption (Initial) | Optical Absorption (Final) |
|---|---|---|
| 542 nm | 3.7 | 0 |
| 287 mm | 1.2 | 0 |
| 207 nm | 2.9 | 0 |

The zero absorbance after treatment with titanium peroxide gel indicates the complete removal of basic magenta from the aqueous solution.

Example 19

10 g titanium peroxide gel was placed in a 100 ml beaker containing 10 ml ink solution. The solution was shaken vigorously and allowed to stand for some five minutes. The ink was adsorbed on the titanium peroxide gel and settled at the bottom of the beaker with the supernatant colorless solution. The solution containing titanium peroxide gel with adsorbed ink was filtered using GI Whatman filter paper to obtain colorless solution.

Example 20

10 g titanium peroxide gel was taken in 250 ml beaker containing 100 ml $10^{-11}$ molar malachite green solution. The solution was shaken vigorously and allowed to stand for five minutes. The malachite green dye was adsorbed on the titanium peroxide gel and settled at the bottom of the beaker with the supernatant colorless solution. The solution containing titanium peroxide gel with adsorbed malachite green dye was filtered using GI Whatman filter paper to obtain colorless solution. The gel with adsorbed malachite green was transferred to a beaker and 100 ml distilled water was added to it. The gel was exposed to sunlight for four hours and the gel regained its original color. The gel was reused for the treatment of $10^{-4}$ molar malachite green solution. The malachite green content in the initial and final treated solution was monitored by using UV-VIS spectrophotometer (Shimadzu 2010) by measuring its absorption at 618, 423, 315 and 254.8 nm wavelength.

The optical absorption of the initial and final solution after treatment with regenerated titanium peroxide gel was as follows:

| Wavelength | optical absorption (Initial) | Optical Absorption (Final) |
|---|---|---|
| 618 nm | 1.1 | 0 |
| 423 mm | 0.2 | 0 |
| 315 nm | 0.3 | 0 |
| 254.8 nm | 0.6 | 0 |

Example 21

10 g gold titanium peroxide gel was placed in a glass column of 15 mm i. d. and 25 cm length fitted with a sintered disc (G0) and a stopcock to control the flow of the solution. 100 ml 564-ppm aqueous formaldehyde solution was passed through the gel at the rate of 5 ml/min. The filtrate obtained contained 60 ppm of formaldehyde which confirms 90% removal of formaldehyde from aqueous solution.

Example 22

10 g gold titanium peroxide gel was placed in a glass column of 15 mm i. d. and 25 cm length fitted with a sintered disc (G0) and a stopcock to control the flow of the solution; 50 ml synthetic hexamine waste water containing 1000 ppm formalin, 3500 ppm methanol, 2000 ppm hexamine and 500 ppm ammonia in water was passed through the gel over period of 3 hours. The COD of the filtrate was 800 compared to COD of 12000 of initial hexamine waste water before treating with gel.

Example 23

10 g gold titanium peroxide gel was placed in a glass column of 15 mm i. d. and 25 cm length fitted with a sintered disc (G0) and a stopcock to control the flow of the solution. 100 ml 50% aqueous methanol solution was passed through the gel over a period of 2 hours. The methanol content in the filtrate was monitored by UV-VIS spectrophotometer (Shimadzu 2010) by measuring its absorption at 245 and 235 nm wavelength and comparison with the calibration curve by UV. The concentration of the methanol decreased from 50% to 12.5%.

Example 24

10 g gold titanium peroxide gel was added to a 250 ml beaker containing 50 ml 500 ppm phenol solution in water. The solution was shaken vigorously and allowed to stand for thirty minutes. The solution containing gold titanium peroxide gel was filtered using G1 Whatman filter paper. The COD of the filtrate decreased to 240 from 1040 for initial 500 ppm phenol solution.

Example 25

10 g titanium peroxide gel was added to a 250 ml beaker containing 100 ml $10^{-4}$ molar malachite green solution in acetone. The solution was shaken vigorously and allowed to stand for thirty minutes. The malachite green dye was adsorbed on the-titanium peroxide gel and settled at the bottom of the beaker with the supernatant solution becoming almost colorless. The solution containing titanium peroxide gel with adsorbed malachite green dye was filtered using G1 Whatman filter paper to obtain almost colorless solution. The malachite green content in the solution before and after the treatment was monitored by UV-VIS spectrophotometer (Shimadzu 2010) by measuring its absorption at 623, 427 and 341 nm wavelength with acetone as reference. The optical absorption of the initial and final solution was as follows:

| Wavelength | optical absorption (Initial) | Optical Absorption (Final) |
|---|---|---|
| 623 nm | 4.74 | 0.89 |
| 427 mm | 3.97 | 0.87 |
| 341 nm | 0.82 | 0.18 |

The considerable decrease in absorbance after treatment with titanium peroxide gel indicates the maximum removal of malachite green from the acetone solution.

Example 26

10 g titanium peroxide gel was added to a 250 ml beaker containing 100 ml $10^{-4}$ molar malachite green solution in chloroform. The solution was shaken vigorously and allowed to stand for thirty minutes. The malachite green dye was adsorbed on the titanium peroxide gel with the gel floating on chloroform with the chloroform layer becoming almost colorless. The solution containing titanium peroxide gel with adsorbed malachite green dye was filtered using GI Whatman filter paper to obtain almost colorless solution. The malachite green content in the solution before and after the treatment was monitored by UV-VIS spectrophotometer (Shimadzu 2010) by measuring its absorption at 623, 427 and 341 nm wavelength with chloroform as reference. The optical absorption of the initial and final solution was as follows:

| Wavelength | optical absorption (Initial) | Optical Absorption (Final) |
|---|---|---|
| 623 nm | >5 | 0.81 |
| 427 mm | >5 | 0.83 |
| 341 nm | 1.96 | 0.33 |

The considerable decrease in absorbance after treatment with titanium peroxide gel indicates the maximum removal of malachite green from the chloroform solution.

Example 27

10 g titanium peroxide gel was added to a 250 ml beaker containing 100 ml $10^{-4}$ molar methyl violet solution in acetone. The solution was shaken vigorously and allowed to stand for thirty minutes. The methyl violet dye was adsorbed on the titanium peroxide gel and settled down at the bottom of the beaker with the supernatant solution becoming almost colorless. The solution containing titanium peroxide gel with adsorbed methyl violet dye was filtered using G1 Whatman filter paper to obtain almost colorless solution. The methyl violet content in the solution before and after the treatment was monitored by UV-VIS spectrophotometer (Shimadzu 2010) by measuring its absorption at 581 and 543 nm wavelength with acetone as reference. The optical absorption of the initial and final solution was as follows:

| Wavelength | optical absorption (Initial) | Optical Absorption (Final) |
|---|---|---|
| 581 nm | 1.35 | 0.32 |
| 543 mm | 1.03 | 0.25 |

The considerable decrease in absorbance after treatment with titanium peroxide gel indicates the maximum removal of methyl violet from the acetone solution.

Example 28

10 g titanium peroxide gel was added to a 250 ml beaker containing 100 ml $10^{-4}$ molar methyl violet solution in ethanol. The solution was shaken vigorously and allowed to stand for thirty minutes. The methyl violet dye was adsorbed on the titanium peroxide gel and settled at the bottom of the beaker with the supernatant solution becoming almost colorless. The solution containing titanium peroxide gel with adsorbed methyl violet dye was filtered using G1 Whatman filter paper to obtain almost colorless solution. The methyl violet content in the solution before and after the treatment was monitored by UV-VIS spectrophotometer (Shimadzu 2010) by measuring its absorption at 581 and 543 nm wavelength with ethanol as reference. The optical absorption of the initial and final solution was as follows:

| Wavelength | optical absorption (Initial) | Optical Absorption (Final) |
|---|---|---|
| 581 nm | 3.89 | 0.29 |
| 543 mm | 3.22 | 0.23 |

The considerable decrease in absorbance after treatment with titanium peroxide gel indicates the maximum removal of methyl violet from the acetone solution.

Example 29

10 g of gels prepared as per the procedure given in examples 2-6 were added separately to a 250 ml beakers containing 100 ml $10^{-4}$ molar methylene blue solution. The solutions were shaken vigorously and allowed to stand for five minutes. The methylene blue dye was adsorbed on these gels and settled at the bottom of the beakers with the supernatant solution becoming colorless. The solution containing gels with adsorbed methylene blue dye were filtered using G1 Whatman filter paper to obtain colorless solution. The methylene blue content in the solution before and after the treatment was monitored by UV-VIS spectrophotometer (Shimadzu 2010) by measuring its absorption at 665, 612, 290 and 245 nm wavelength. The optical absorption of the initial and final solution for all the gels were same and were as follows:

| Wavelength | optical absorption (Initial) | Optical Absorption (Final) |
|---|---|---|
| 665 nm | 6.0 | 0 |
| 612 mm | 5.0 | 0 |
| 290 nm | 3.34 | 0 |
| 245 nm | 1.70 | 0 |

The zero absorbance after treatment with titanium peroxide gel indicates the complete removal of methylene blue from the aqueous solution.

The gels filtered using G1 Whatman filter paper which contains adsorbed methylene blue were transferred to the 250 ml beaker containing 10 ml water. These beakers were kept in the sunlight till the blue color of the gel disappeared and again regained its original color. The activity of the gels for degradation of methylene blue in sunlight was according to following order:

Pt—Ti gel (example 6)>Au—Ti gel (example 2)>Mo—Ti gel (example 5)>V—Ti gel (example 4)>Fe—Ti gel (example 3)>Ti gel (example 1)

We claim:
1. A process for the removal of an organic dye or an organic pollutant from a solution, said organic dye or organic pollutant selected from the group consisting of methylene blue, methyl orange, methyl violet, malachite green, Rhodamine B, bromophenol blue, parabase solution, magenta solution, ink, formaldehyde solution, synthetic hexamine, and waste water from said solution, using a titanium peroxide gel, wherein said titanium peroxide gel contains from 0.001-0.005 wt % of a titanium salt and is doped with particles of a metal or metal oxide, said particles having a particle size that is less than 10 nm, the process comprising:
  a) adding said titanium peroxide gel into said solution at a ratio ranging between 1:5 and 1:20 volume/volume of said titanium peroxide gel to said solution of organic dye or organic pollutant to form a mixture, wherein said titanium peroxide gel has a zeta potential in the range of −54 to −25 mV and viscosity in the range of 12000-15000 cPs;
  b) shaking the mixture as obtained in step (a) at a temperature ranging from 25 to 35° C.;
  c) allowing the mixture obtained in step (b) to stand for 5 to 25 minutes to obtain said organic dye or said organic pollutant adsorbed to said titanium peroxide gel and clear, colorless supernatant, followed by filtering the mixture to obtain said organic dye or organic pollutant adsorbed titanium peroxide gel;

d) transferring said organic dye or organic pollutant adsorbed titanium peroxide gel as obtained in step (c) to a water containing beaker; and e) degrading said adsorbed organic dye or organic pollutant from the organic dye or organic pollutant adsorbed titanium peroxide gel to recover the titanium peroxide gel for reuse.

2. The process of claim 1, wherein the particles of a metal or metal oxide comprise a noble or transition metal selected from the group consisting of gold, silver, nickel, copper, iron, molybdenum, vanadium, tungsten, and platinum at a range of 0.1-4 wt %.

3. The process of claim 1, wherein said organic dye or said organic pollutant is selected from the group consisting of methylene blue, methyl orange, methyl violet, malachite green, Rhodamine B, bromophenol blue, parabase solution, magenta solution, ink, formaldehyde solution, synthetic hexamine, waste water, and phenol.

4. The process of claim 1, comprising removing from 95 to 100% (w/w) of said organic dye or said organic pollutant from said solution.

5. The process of claim 1, comprising degrading said organic dye and said organic pollutant from said organic dye or said organic pollutant adsorbed titanium peroxide gel in step (e) by exposure to sunlight.

6. The process of claim 1, comprising removing said organic dye or said organic pollutant from said solution by running said solution through a titanium peroxide gel containing column.

7. The process of claim 5, further comprising exposing said organic dye or said organic pollutant adsorbed titanium peroxide gel to an oxidant.

8. The process of claim 7, wherein said oxidant is selected from the group consisting of hydrogen peroxide, and sodium hydrochlorite.

* * * * *